June 19, 1934.  J. F. DUFFY  1,963,941
INSPECTION DOOR CONSTRUCTION
Filed Jan. 3, 1933
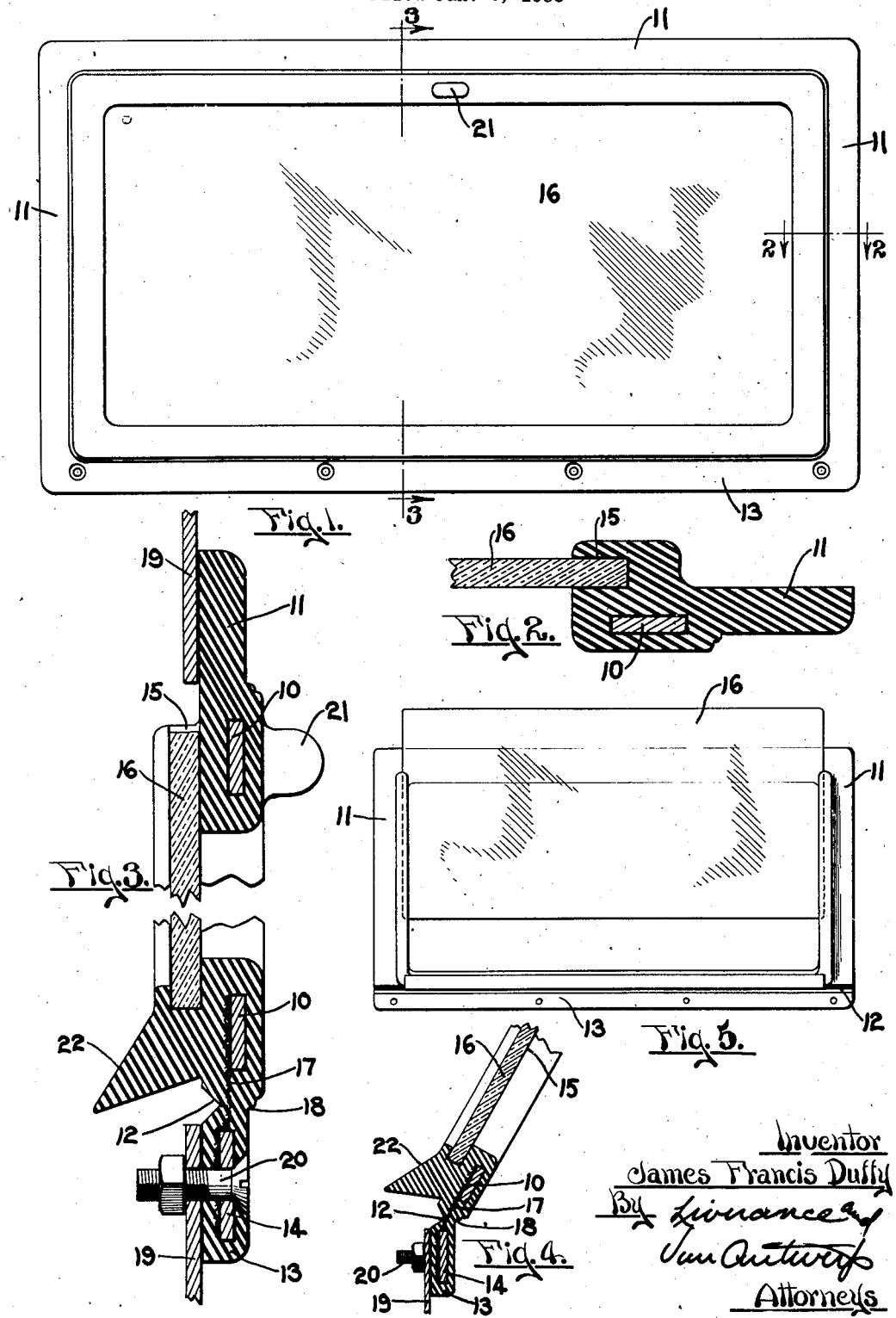

Patented June 19, 1934

UNITED STATES PATENT OFFICE 1,963,941

INSPECTION DOOR CONSTRUCTION

James Francis Duffy, Holland, Mich., assignor to Duffy Manufacturing Company, Holland, Mich., a corporation of Michigan Application January 3, 1933, Serial No. 649,892

4 Claims. (Cl. 20—16)

This invention relates generally to a door construction and more particularly to a door and hinge integrally molded from rubber composition, the door slidably receiving a glass insert therein.

Briefly described, the door consists of a metal frame member having rubber composition molded entirely therearound, said rubber composition being grooved at one side of the door to form a hinge and also being grooved around the interior of the frame to slidably receive a sheet of transparent material therein.

One of the principal advantages of my invention resides in the unit construction of the door together with its hinge whereby expense of installation of the same is greatly reduced inasmuch as it is only necessary to fasten a single side of the unit in place, such attachment securing the door and the hinge in proper alined position.

Furthermore, another advantage resides in the construction of the hinge itself, this hinge being so constructed that the rubber or material therein tends to maintain the door in its closed position. Moreover, the hinge is so constructed that the rubber therein is only placed in compression when the door is opened and this not only gives more yielding force to close the door but it prevents deterioration of the rubber due to its elongation, such being more detrimental thereto than compressive stresses.

Another feature of my invention resides in the protecting means which is in the form of a lip and which extends inwardly from the door downwardly over the hinge and thus shields the groove therein. This is particularly desirable when the door is used as a closure against water sprays or vapors. That is, the door, having means therein whereby one may see therethrough, is widely used in air conditioning units, the door preventing the water, which is being diffused in such conditioning unit, from being thrown outwardly therethrough and yet permitting access into the conditioner whenever required or desired.

Further objects and advantages will be apparent as the description proceeds.

In the drawing:—

Fig. 1 is a front view of my invention.

Fig. 2 is a fragmentary sectional view taken along the line 2—2 of Fig. 1.

Fig. 3 is a cross sectional view taken along the line 3—3 of Fig. 1.

Fig. 4 is a somewhat reduced cross sectional view of the bottom portion of Fig. 3 showing the door in a partly opened position.

Fig. 5 is a reduced rear view of Fig. 1, this view showing the glass in a partly removed position.

Similar numerals refer to similar parts throughout the several views.

Referring to the drawing, numeral 10 indicates a rectangularly shaped open metal frame which is covered by a rubber composition extending entirely around the frame and including a flat outer portion 11. At one side of the frame, see Figs. 3, 4 and 5, a groove 12 separates a portion of the structure to form a flap or hinge element 13 having a metal reinforce 14 therein.

The rubber composition forming the frame is thickened at three sides of the opening, see Figs. 2, 3 and 5, and grooves 15 are formed therein to receive the glass or light 16. As shown in Fig. 5, the glass 16 is adapted to be inserted or removed by sliding it downwardly or upwardly in the side grooves 15 until it seats into the lower groove 15, the friction between the glass 16 and the grooves 15 maintaining it in place. Figs. 1 and 3 show the glass in its operative position.

As previously mentioned, a reinforcing strip, preferably formed of metal, extends along the flap portion 13, see Figs. 3 and 4, and a fabric strip 17 is located alongside of the metal reinforcing strip 14 and extends through the neck portion 18 adjacent the groove 12 and terminates alongside of the metal frame 10.

This fabric member 17 is molded in position during the construction of the frame and extends immediately adjacent the bottom of the groove 12 and acts to prevent elongation of the rubber at this point. Hence, when the door is moved about the neck portion as a hinge, see Fig. 4, the rubber will be compressed at the right hand side of the neck but will not be stretched or tensioned at the left side of the neck and hence tearing and deterioration of the rubber is prevented.

The numeral 19 indicates a casing or the like to which the flap portion 13 of the door is mounted by the bolts 20. A knob 21 extends from the upper part of the frame and serves as gripping means for opening the door. See Figs. 1 and 3.

A tapered portion, see Fig. 3, extends outwardly to form a shielding lip 22 which prevents water from seeping through the lower portion of the door.

The operation of the door is easily understood. After the door has been bolted into position, the tendency thereof is for it to remain closed due to the stiff resilient action of the hinge member. When in closed position, see Fig. 3, the flat outer portions 11 of the door fit snugly against the casing member 19 and any moisture striking against the inner side of the glass or the door drains downwardly therealong and drips from the lowered tapered edge or lip 22, thus preventing the same from collecting around the hinge of the door. Whenever it is desired to open the door, the knob projection 21 is grasped and pulled outwardly whereupon the hinge or neck portion 18 is flexed by compression stresses only and upon release of the door, the resiliency of the hinge tends to swing the door back to its closed position.

From the above description, it will be appreciated that my device is exceedingly simple to manufacture and is also exceedingly simple to install. Furthermore, the door is long lived due to the novel hinge construction and is neat in appearance inasmuch as the frame is of the same width entirely therearound.

I claim:

1. An inspection door of the class described comprising, a frame formed of composition or the like, said frame having a resilient flap portion extending therefrom, said flap portion being connected to the said frame by a relatively thin portion, and relatively stout fabric means inserted at one side of the relatively thin portion and said fabric means also being firmly embedded in the frame portion and the resilient flap portion whereby tensioning of the rubber is prevented when the frame is turned in one direction relatively to the said flap portion.

2. In a construction of the class described, a hinge including a neck of resilient material connecting the two members which are to be hinged, and non-yieldable fabric means extending between the two members and being inserted adjacent one side of said neck whereby the predetermined movement of the hinge in one direction will cause only compressing of the resilient material.

3. In an article of the class described, a metal frame member of rectangular shape, rubber molded about said frame member to entirely conceal the same, said rubber extending from said frame member outwardly to form flaps of lesser thickness than the remainder of the article, one of said flaps and said frame being separated by a groove, said groove being located in alinement with the juncture between the flap and the frame member of the article and a reinforcing strip inserted in said flap member.

4. An article of manufacture as recited in claim 3 but also having a lip integrally formed with the frame, said lip being of triangular cross sectional shape and extending outwardly over the said groove.

JAMES FRANCIS DUFFY.